(12) United States Patent
Sawada

(10) Patent No.: US 6,259,581 B1
(45) Date of Patent: Jul. 10, 2001

(54) CHUCKING DEVICE IN FDD

(75) Inventor: Toru Sawada, Fukushima (JP)

(73) Assignee: Alps Electric Co. Ltd., Tokyo (JP)

( * ) Notice: Subject to any disclaimer, the term of this patent is extended or adjusted under 35 U.S.C. 154(b) by 0 days.

(21) Appl. No.: 09/387,602

(22) Filed: Aug. 31, 1999

(30) Foreign Application Priority Data

Sep. 1, 1998 (JP) .................................................. 10-247605

(51) Int. Cl.$^7$ .................................................. G11B 17/02
(52) U.S. Cl. .......................................................... 360/99.04
(58) Field of Search .............................. 360/99.04, 99.08

(56) References Cited

U.S. PATENT DOCUMENTS 4,742,408 * 5/1988 Kumagai ................................. 360/99
4,825,314   4/1989 Maekawa et al. .
4,873,595 * 10/1989 Taguchi et al. .................... 360/99.08
5,121,272 * 6/1992 Maekawa et al. ................. 360/99.08
5,610,779 * 3/1997 Kawana .............................. 360/99.04

* cited by examiner

Primary Examiner—Robert S. Tupper
(74) Attorney, Agent, or Firm—Brinks Hofer Gilson & Lione

(57) ABSTRACT

A chucking device in a floppy disk drive comprises a rotor yoke adapted to rotate in a predetermined certain direction with a center hub of a floppy disk placed thereon, a drive pin mounted loosely into a drive pin through hole formed in the peripheral portion of the rotor yoke and further inserted loosely into a drive pin aperture formed in the center hub, and a spring mounted to the rotor yoke and functioning to push the drive pin not only upward but also in a direction F away from a rotational axis of the rotor yoke. When the rotor yoke is rotated with the floppy disk placed thereon and with a center shaft inserted into a central aperture of the center hub, the drive pin is inserted into the drive pin aperture and comes into abutment, within the drive pin aperture, with both front edge and outer edge of the same aperture in the rotational direction of the rotor yoke.

4 Claims, 4 Drawing Sheets

CHUCKING DEVICE IN FDD

BACKGROUND OF THE INVENTION

1. Field of the Invention

The present invention relates to a chucking device in an FDD (floppy disk drive) capable of effecting centering easily and accurately at the time of loading a floppy disk into the FDD.

2. Description of the Related Art

A recording medium, typical of which is a floppy disk, is loaded into an FDD in the form of a disk cartridge in which a thin film-like recording disk is received in a case, the recording disk is rotated within the FDD, and recording data are inputted and outputted through a write/read window formed in the case and having a shutter. It is necessary that the recording disk be capable of being removed easily in its received state in the case and aligned exactly with a rotational axis of the FDD at the time of write or read and that the rotating speed thereof be controlled accurately. To meet these requirements, such a chucking device as shown in FIGS. 6 and 7 has heretofore been used for the FDD.

A center hub formed by a ferromagnetic metal disk is centrally mounted on a recording disk of a floppy disk. As shown in FIGS. 6 and 7, a generally square central aperture 3 is formed centrally of the center hub which is indicated at 2, and a generally rectangular drive pin aperture 4 is formed in a peripheral position of the center hub. The drive pin aperture 4 has a front edge 4a at a front position in a rotational direction of a rotor yoke and an outer edge 4b in a direction ("outer" hereinafter) away from a rotational center of the rotor yoke.

On the other hand, the FDD is provided with a rotor yoke 101 which is constituted by a ferromagnetic metal disk and which is rotated in a certain direction (indicated at "D" in the figures) by means of a motor (not shown). A magnetic disk (chucking magnet) 102 is held in place on the rotor yoke 101 through a boss and a boss hole and is attracted magnetically.

A center shaft 103 is erected at a rotational axis O of the rotor yoke 101. The center shaft 103 extends through a central opening 102a of the magnetic disk 102 and is inserted loosely into the central aperture 3 of the center hub.

The term "loosely" as used herein indicates a freely movable state in both horizontal and vertical directions and within a predetermined range.

In the peripheral portion of the rotor yoke 101 is formed a drive pin through hole 104 along the circumference, and a chucking arm 105 formed arcuately along the circumference is loosely fitted in the drive pin through hole 104. An upwardly extending drive pin 106 is formed at a front end portion ("front portion" hereinafter) 105a of the chucking arm 105 facing the rotational direction D of the rotor yoke 101. The drive pin 106 extends loosely through a front aperture 102b formed in the magnetic disk 102 and is inserted loosely into the drive pin aperture 4 of the center hub. At the front portion 105a of the chucking arm 105 are formed two flanges 105c which hold loosely the rotor yoke 101 portion located around the front portion of the drive pin through hole 104 and which support the front portion of the chucking arm 105 so as to be freely movable in both horizontal and vertical directions and within a predetermined range.

On the other hand, the other end portion ("rear portion" hereinafter), indicated at 105b, of the chucking arm 105 extends backward of the upper surface of the rotor yoke 101 at an approximately right angle from the rear end of the drive pin through hole 104, and within a rear aperture 102c formed in the magnetic disk 102 a pivot shaft 108 projecting from the upper surface of the rotor yoke 101 is received in a receiving aperture 105d so as to be pivotable horizontally about the pivot shaft 108 and within the width range of the drive pin through hole 104.

A ferromagnetic plate 109 is mounted on the body of the chucking arm 105, whereby the whole of the chucking arm 105 is attracted magnetically by the magnetic disk 102 and the drive pin 106 is pulled upward at all times.

Upon loading of a floppy disk into the FDD constructed as above, the recording disk is placed on the rotor yoke 101, the center hub 2 mounted on the disk is attracted magnetically by the magnetic disk 102, and the central aperture 3 of the center hub receives the rotor yoke-side center shaft 103 therein. At this time, the drive pin 106 projecting upward from the magnetic disk 102 need not be inserted into the drive pin aperture 4 of the center hub. With the drive pin 106 not inserted into the drive pin aperture 4, the pin 106 is pushed in by the center hub 2 up to the lower surface level of the center hub against the attractive force induced by the ferromagnetic plate 109.

In this state, when a motor (not shown) is turned ON, causing the rotor yoke 101 to rotate fully once at most in the D direction, the top of the drive pin 106 slides and rotates on the lower surface of the center hub and is received in the drive pin aperture 4, within which the drive pin rises by virtue of the attractive force of the ferromagnetic plate 109. As the rotor yoke 101 further rotates in the D direction in this state, the chucking arm 105 moves pivotally in a direction in which the drive pin 106 moves away from the rotational axis O of the rotor yoke 101 under the action of a centrifugal force induced by the rotation of the rotor yoke 101, and the drive pin 106 comes into abutment with the outer edge 4b of the drive pin aperture 4. At the same time, the drive pin 106 slides forward within the drive pin aperture 4 by virtue of the rotational force of the rotor yoke 101 and come into abutment also with the front edge 4a of the drive pin aperture 4. As a result, the drive pin 106 is supported in abutment with the two sides of the front and outer edges 4a, 4b of the drive pin aperture 4. This state will hereinafter be referred to as "front-outer support."

At this time, the center shaft 103 is supported by being abutted against two adjacent sides 3a and 3b of the central aperture 3 of the central hub on the side opposite to the drive pin 106 with respect to the rotational axis O and in this state the center of the recording disk and the rotational axis O of the rotor yoke 101 coincide with each other to complete chucking. In this state the recording disk of the floppy disk can rotate while exactly following up a controlled rotating speed of the rotor yoke 101.

The above conventional chucking device uses the chucking arm 105 for attaining the front-outer support for the drive pin 106. However, since the chucking arm relies for the front-outer support on only the swing motion based on the centrifugal force of the arm, there sometimes occurs a case where the swing motion stops with the drive pin 106 not in abutment with the outer edge 4b due to, for example, a sliding resistance induced between the arm and the rotor yoke and the recording disk shifts directly to a continuous rotation. In this state, the rotation of the recording disk will be eccentric because the normal front-outer support position is not reached yet. Such an eccentric rotation gives rise to the problem that there occurs an error in writing and reading of data.

There has also been the problem that the mounting of the chucking arm 105 is troublesome and that therefore the manufacturing cost increases.

SUMMARY OF THE INVENTION

The present invention has been accomplished for solving the above-mentioned problems and it is therefore an object of the invention to provide a chucking device in a floppy disk drive which realizes the foregoing front-outer support in a positive and inexpensive manner and which thereby prevents an eccentric rotation of a recording disk and always ensures correct writing and reading.

In order to solve the above-mentioned problems, according to the present invention, there is provided a chucking device in a floppy disk drive, comprising: a rotor yoke adapted to rotate in a predetermined certain direction with a center hub of a floppy disk placed thereon; a center shaft erected at a rotational axis of the rotor yoke and inserted loosely into a central aperture of the center hub; a drive pin extending loosely through a drive pin through hole formed in the peripheral portion of the rotor yoke and further through a drive pin aperture formed in the peripheral portion of the center hub, the drive pin aperture having a front edge at a front portion thereof in a rotational direction of the rotor yoke and also having an outer edge at an outer position (in a direction away from the rotational axis of the rotor yoke); and a spring mounted to the rotor yoke and formed so as to push the drive pin not only upward but also in a direction away from the rotational axis of the rotor yoke, wherein when the rotor yoke is rotated with the floppy disk placed on the rotor yoke and with the center shaft inserted into the central aperture of the center hub, the drive pin is inserted into the drive pin aperture of the center hub and comes into abutment, within the drive pin aperture, with the front and outer edges of the drive pin aperture.

In the above constitution, since the drive pin is pushed upward by the spring, the drive pin is sure to be inserted into the drive pin aperture of the center hub while the rotor yoke is rotated fully once at most. Further, the drive pin is also pushed outward by the spring, so when the rotor yoke is rotated in the inserted state of the drive pin into the drive pin aperture, the drive pin comes into abutment not only with the front edge of the drive pin aperture but also with the outer edge of the aperture by virtue of the urging force of the spring, whereby the foregoing front-outer support is realized and a positive chucking for the floppy disk is attained.

Further, according to the present invention, there is provided a chucking device in a floppy disk drive, wherein the drive pin has an upper flange and a lower flange which sandwich vertically loosely the rotor yoke portion located around the drive pin through hole, thereby preventing the drive pin from coming off the drive pin through hole.

In the above constitution, the drive pin is supported vertically by the upper and lower flanges and can move freely within a predetermined range in both vertical and horizontal directions without falling off the drive pin through hole. Besides, the frictional resistance during the movement of the drive pin is minimized and therefore the foregoing front-outer support is attained smoothly.

Further, according to the present invention, there is provided a chucking device in a floppy disk drive, wherein the spring is constituted by a generally U-bent wire rod, the bent portion of the spring being positioned so as to extend along an outer peripheral portion of a pin projecting from a lower surface of the rotor yoke, one end portion of the spring is fixed to the lower surface of the rotor yoke, while the opposite end portion of the spring is made movable, the movable end portion of the spring being urged not only in a direction away from the rotational axis of the rotor yoke but also upward of the rotor yoke and engaged with the drive pin to push the drive pin upward and also in the direction away from the rotational axis of the rotor yoke.

In the above constitution, the chucking device is extremely simple in structure and easy to assemble with the above spring.

Further, according to the present invention, there is provided a chucking device in a floppy disk drive, wherein a magnetic disk which attracts the center hub of the floppy disk magnetically is placed on an upper surface of the rotor yoke, a cutout portion for insertion therein of the drive pin is formed in the magnetic disk, the cutout portion having a conduction path which is inclined in a gradually retreating direction as the distance from the rotational axis of the rotor yoke becomes longer, the magnetic disk being fixed to the rotor yoke so that the conduction path comes into abutment with a rear side face of the drive pin, and when the rotor yoke is rotated, the drive pin is held between the front edge of the drive pin aperture in the center hub and the conduction path of the cutout potion and is urged in this state to the outer edge of the drive pin aperture.

In the above constitution, since the conduction path continues to push the drive pin against the outer edge of the drive pin aperture during rotation of the rotor yoke, eccentricity of the floppy disk and vibration of the drive pin are prevented even upon rebounding of the spring, whereby the stability of chucking is maintained.

Further, according to the present invention, there is provided a chucking device in a floppy disk drive, wherein the drive pin through hole is in the shape of a keyhole comprising a main hole and a mounting hole both contiguous to each other, the mounting hole having a shape which permits insertion therein of the lower flange of the drive pin, the main hole having a shape which prevents the drive pin from falling off in a mounted state of the drive pin, and the drive pin is fitted into the drive pin through hole in such a manner that the lower portion of the drive pin, including the lower flange, is inserted into the mounting hole and is then shifted into the main hole.

In the above constitution, the mounting of the drive pin is easy during assembly of the FDD, and after the assembly, the drive pin is held loose in both vertical and horizontal directions within the drive pin through hole and is prevented from falling off the same hole.

DETAILED DESCRIPTION OF A PREFERRED EMBODIMENT

The present invention will be described in more detail hereunder by way of an embodiment thereof.

Figure 1:
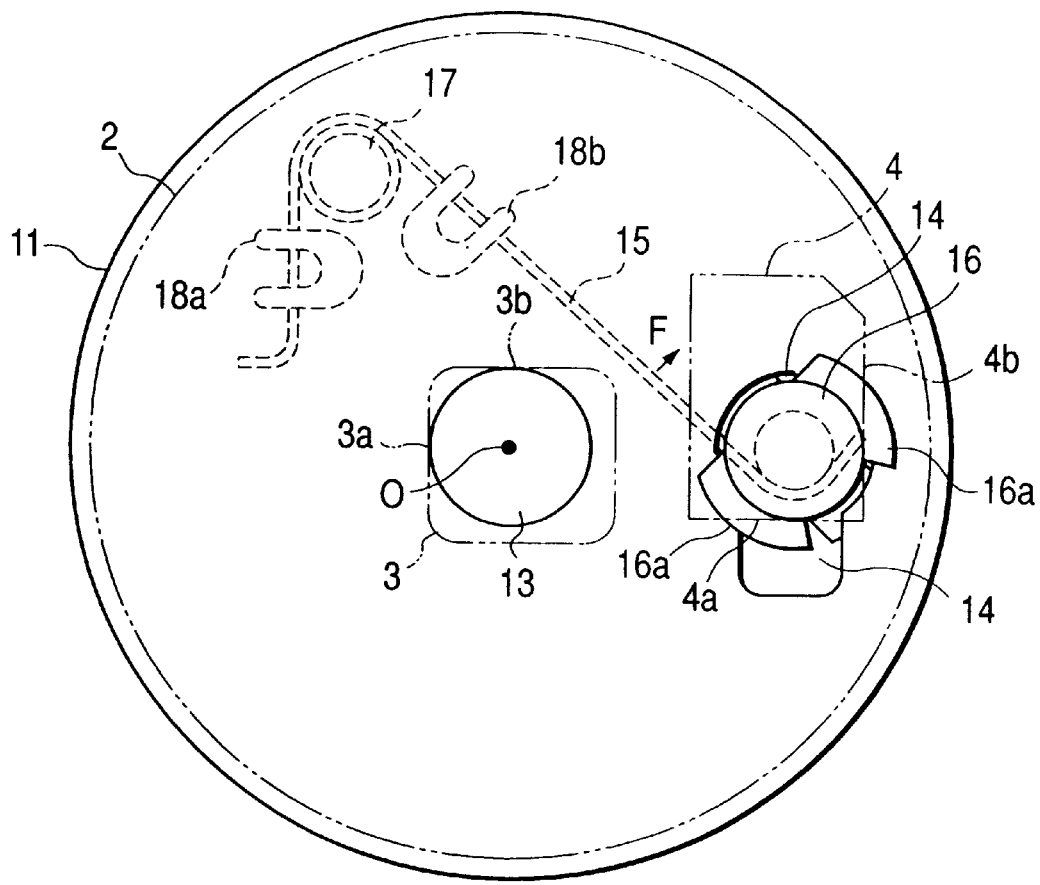
FIG. 1 is a plan view showing an embodiment of the present invention.
Figure 6:
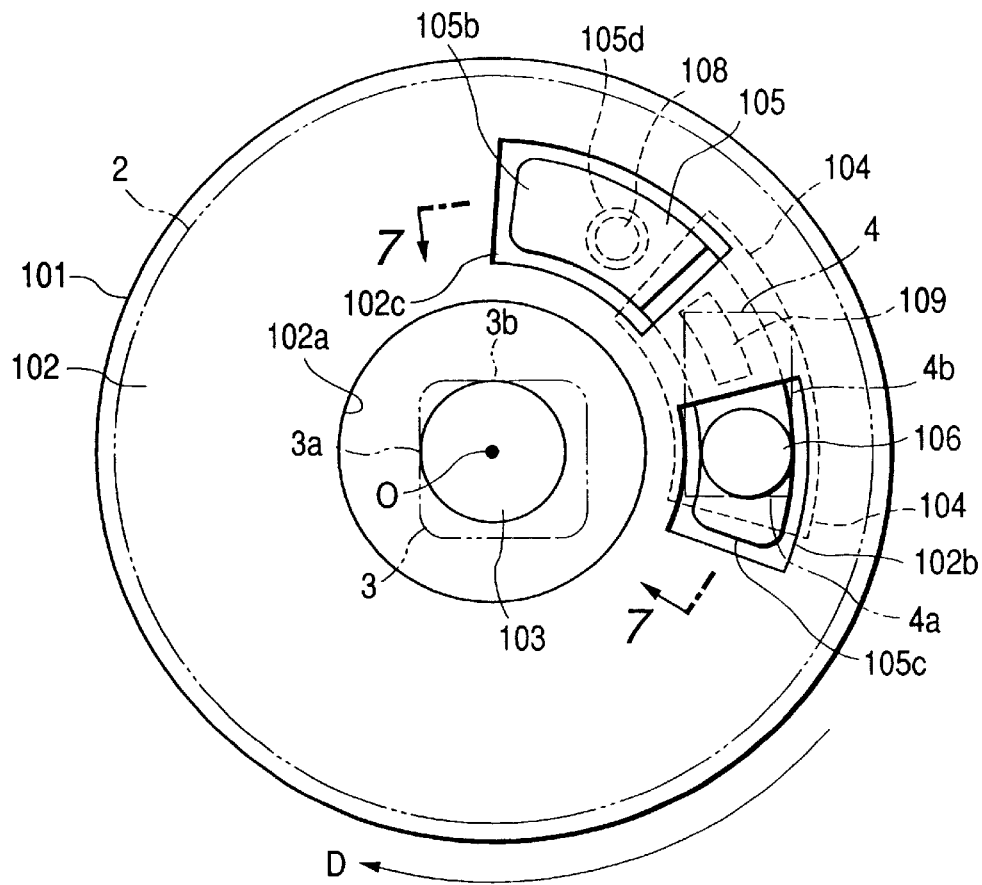
FIG. 6 is a plan view showing an example of a conventional chucking device.
Figure 7:
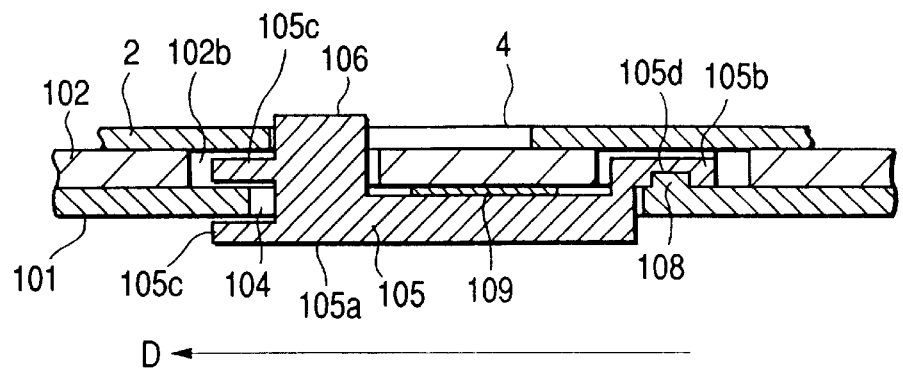
FIG. 7 is a sectional view taken along an arcuate dot-dash line 7—7 in FIG. 6.

FIG. 1 shows a part of an FDD having a chucking device in the present invention. In the following description, the constituent elements common to the conventional constituent elements described above with reference to FIGS. 6 and 7 will be identified by the same reference numerals as in those figures and explanations thereof will be omitted or made in brief.

In FIG. 1, the FDD in question has a rotor yoke 11 adapted to rotate in a predetermined certain direction and with a center hub 2 of a floppy disk placed thereon, a center shaft 13 erected at a rotational axis O of the rotor yoke 11 and inserted loosely (movably in both horizontal and vertical directions within a predetermined range) into a central aperture 3 of the center hub, a drive pin 16 mounted loosely into a drive pin through hole 14 formed in the peripheral portion of the rotor yoke 11 and inserted loosely into a drive pin aperture 4 formed in the peripheral portion of the center hub 2, and a spring 15 mounted to the underside of the rotor yoke 11 so as to push the drive pin 16 upward and outward (F direction in the figure). In this FDD, in addition to these components, a magnetic disk which attracts the center hub 2 of the floppy disk magnetically is placed on an upper surface of the rotor yoke 11, but illustration and explanation thereof are here omitted.

Upon loading of the floppy disk into the FDD, a recording disk of the floppy disk is put on the rotor yoke 11 and the center shaft 13 of the rotor yoke is received in the central aperture 3 of the center hub 2 mounted on the recording disk. At this time, it is optional whether the drive pin 16 projecting upward beyond the magnetic disk (not shown) is to be inserted or not into the drive pin aperture 4 of the center hub. In the case where the drive pin 16 is not inserted into the drive pin aperture, the drive pin is pushed in by the center hub 2 up to the underside level of the center hub 2 against the upward urging force of the spring 15.

When a motor (not shown) is turned ON, causing the rotor yoke 11 to turn fully once at most in the D direction, the top of the drive pin 16 slides on the underside of the center hub 2, reaches the drive pin aperture 4, then rises and is inserted into the same aperture with the urging force of the spring 15. In this state, with further rotation of the rotor yoke 11 in the D direction, the drive pin 16 slides forward within the drive pin aperture 4 and comes into abutment with a front edge 4a of the drive pin aperture.

On the other hand, the drive pin 16 is pushed outward at all times with the spring 15, so with the drive pin 16 inserted into the drive pin aperture 4, the drive pin comes into abutment with an outer edge 4b. As a result, the drive pin 16 is supported by both the front and outer edges 4a, 4b of the drive pin aperture 4 and thus the foregoing "front-outer support" (the drive pin being supported in abutment with both the front and outer edges of the drive pin aperture) is realized.

In this state, the center shaft 13 of the rotor yoke is supported within the center aperture 3 of the center hub by two adjacent sides 3a and 3b of the same aperture on the side opposite to the drive pin 16 with respect to the rotational axis O. Now, the center of the recording disk and the rotational axis O of the rotor yoke 11 are coincident with each other and the chucking operation is completed. Once the chucking is completed, the recording disk of the floppy disk does not become eccentric and can rotate while following up a controlled rotating speed of the rotor yoke 11 exactly.

Figure 2A:
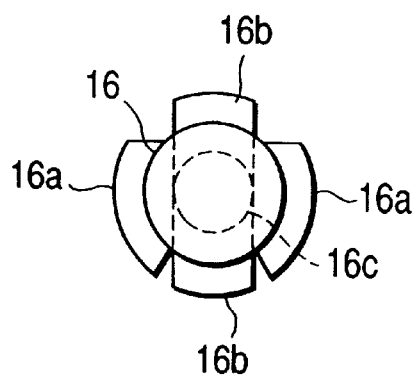
FIG. 2A is a plan view and FIG. 2B is a side view, showing an example of a drive pin used in the embodiment.
Figure 2B:
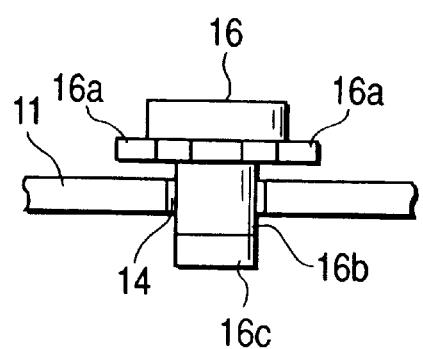

Next, as shown in FIGS. 2A and 2B, the drive pin 16 has upper flanges 16a and lower flanges 16b which sandwich the rotor yoke 11 at the portion of the same yoke located around the drive pin through hole 14. The drive pin 16 is further provided with a shaft portion 16c extending to a lower position than the lower flanges 16b. One end portion, or a front end portion, 15c of the spring 15 is engaged with the shaft portion 16c and the drive pin 16 is pushed upward with the spring 15. With the drive pin 16 inserted into the drive pin aperture 4 of the center hub, upper surfaces of the lower flanges 16b are in pressure abutment against the underside of the rotor yoke 11 near the drive pin through hole 14.

Thus, the drive pin 16 is loosely supported vertically by the upper and lower flanges 16a, 16b, so after the end of assembly, there is no fear of the drive pin coming off the drive pin through hole 14. Besides, the drive pin can move freely in both vertical and horizontal directions within a predetermined range and the frictional resistance induced during the movement is minimized, so that the foregoing front-outer support is realized smoothly.

Figure 4:
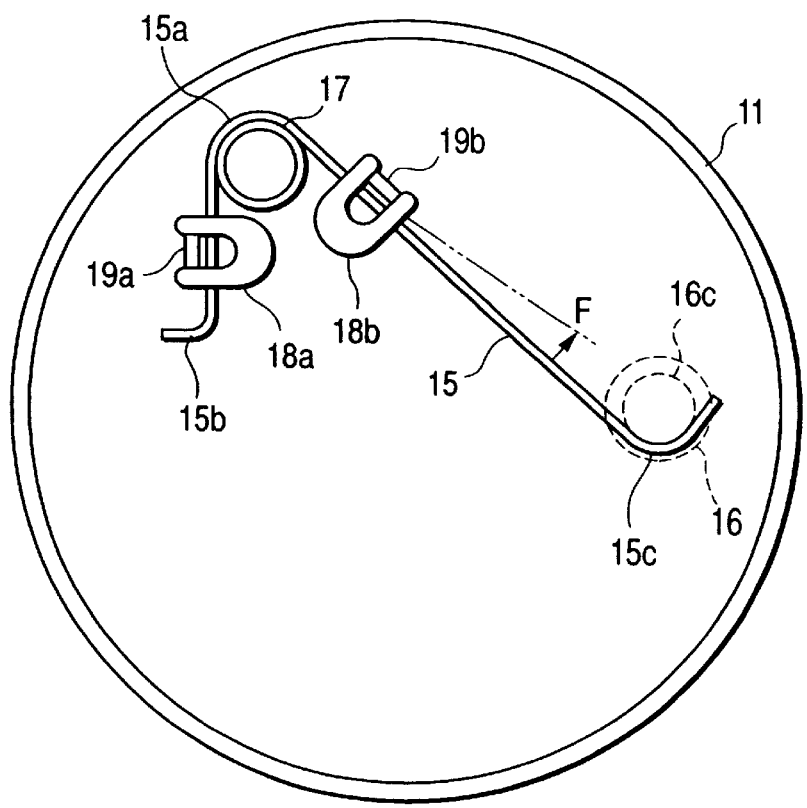
FIG. 4 is a plan view showing an example of a spring used in the embodiment.

As shown in FIG. 4, the spring 15 is constituted by a generally U-bent wire rod. The spring 15 is disposed so that a bent portion 15a thereof extends along an outer peripheral portion of a spring holding pin 17 projecting from the underside of the rotor yoke 11. The other end portion 15b of the spring 15, located on the side opposite to the one end portion 15c, is fixed to the underside of the rotor yoke 11 by means of a hook 18a and a stopper 19a both mounted on the underside of the rotor yoke. The end portion 15c of the spring 15 is held movable within a predetermined range by means of a hook 18b and a stopper 19b. This movable end 15c is urged not only outward but also upward.

The movable end 15c of the spring 15 is engaged with the shaft portion 16c of the drive pin 16 and pushes the drive pin 16 in both outward and upward directions with respect to the rotor yoke 11. Thus, by using a single wire rod spring 15, the foregoing front-outer support can be attained easily and there can be provided an FDD chucking device of a simple structure and extremely easy to assemble.

Figure 5:
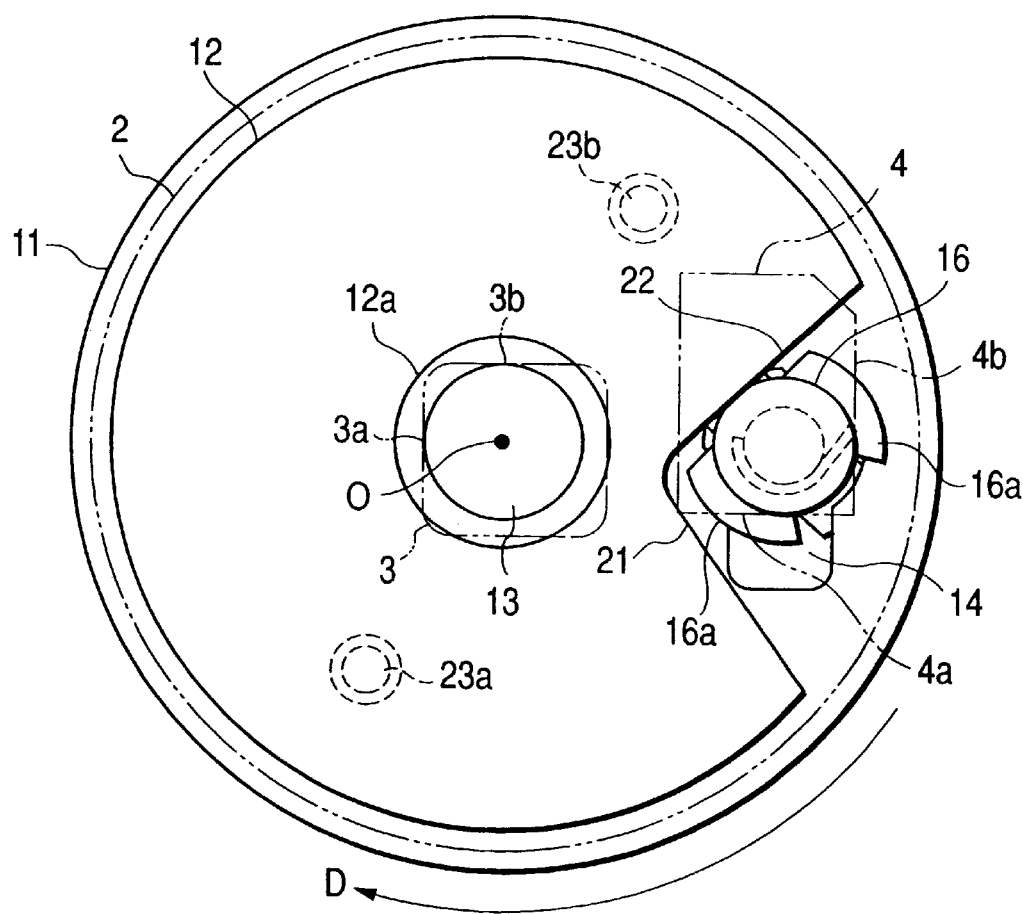
FIG. 5 is a plan view showing an example of a magnetic disk used in the embodiment.

As shown in FIG. 5, a magnetic disk, which attracts the center hub 2 of the floppy disk magnetically, is placed on the upper surface of the rotor yoke 11. A cutout portion 21 for loose insertion therein of the drive pin 16 is formed in the magnetic disk 12, and at a position where the cutout portion 21 comes into abutment with the drive pin 16 during rotation of the rotor yoke there is formed a conduction path 22 which is inclined in a gradually retreating direction (in the direction opposite to the rotational direction D) as the distance from the rotational axis O of the rotor yoke becomes longer.

The magnetic disk 12 is held in place by boss and boss hole 23a, 23b so that the conduction path 22 comes into abutment with a rear side face of the drive pin 16, the boss and boss hole 23a, 23b being formed at positions opposed to each other with respect to the rotational axis O of the rotor yoke. In this state the magnetic disk 12 is fixed to the rotor yoke 11 magnetically.

Consequently, upon rotation of the rotor yoke 11, the drive pin 16 undergoes an outward force while being held between the front edge 4a of the drive pin aperture 4 in the center hub and the conduction path 22 and is thereby urged to the outer edge 4b of the drive pin aperture 4. As a result, even if the drive pin 16 tries to move away from the outer edge 4b due to, for example, rebounding of the spring 15 during operation of the FDD, such a leaving tendency is suppressed and hence the floppy disk is prevented from becoming eccentric. Thus, the stability of chucking is maintained. Moreover, since the drive pin 16 is pushed and supported in three directions by means of the front and outer edges 4a, 4b of the drive pin aperture 4 and the conduction path 22, there no longer is any fear of the drive pin undergoing vibration during operation of the FDD and therefore the stability of chucking is further improved.

Figure 3:
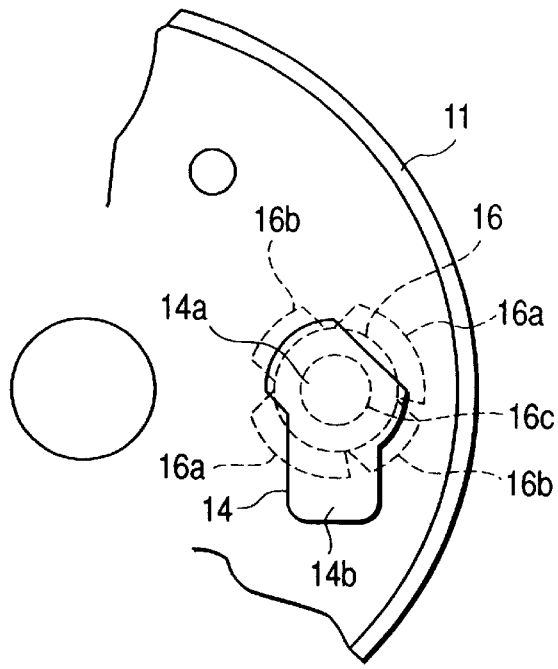
FIG. 3 is a plan view showing an example of a drive pin through hole used in the embodiment.

As shown in FIG. 3, the drive pin through hole in the rotor yoke 11 is formed in the shape of a keyhole comprising a main hole 14a and a mounting hole 14b which is formed so as to permit insertion therein of each lower flange 16b of the drive pin, the main hole 14a and the mounting hole 14b being contiguous to each other. For mounting the drive pin 14b into the drive pin through hole 14, first the lower portion of the drive pin, including the lower flange 16b, is inserted into the mounting hole 14b and then the front end of the spring 15 is brought into engagement with the shaft portion 16c shown in FIGS. 2A and 2B. At this position and angle the drive pin 16 shifts to the main hole 14a of the drive pin through hole and is prevented from coming off both upward and downward by the upper and lower flanges 16a, 16b.

The above shape of the drive pin through hole 14 extremely facilitates the mounting of the drive pin 16 at the time of assembly of the FDD. Besides, after the assembly is over, the drive pin 16 can move smoothly within a predetermined range without coming off the drive pin through hole.

What is claimed is:

1. A chucking device in a floppy disk drive, comprising:
   a rotor yoke adapted to rotate in a predetermined certain direction with a center hub of a floppy disk placed thereon;
   a center shaft erected at a rotational axis of said rotor yoke and inserted loosely into a central aperture of said center hub;
   a drive pin extending loosely through a drive pin through hole formed in the peripheral portion of said rotor yoke and further through a drive pin aperture formed in the peripheral portion of said hub, said drive pin having an upper flange and a lower flange which loosely sandwich the rotor yoke portion located around said drive pin through hole to thereby prevent the drive pin from coming out of the drive pin through hole, said drive pin aperture having a front edge at a front portion thereof in a rotation direction of the rotor yoke and also having an outer edge in a direction away from the rotational axis of the rotor yoke; and
   a spring mounted to the rotor yoke and formed so as to push said drive pin both upward and in a direction away from the rotational axis of the rotor yoke,
   wherein when said rotor yoke is rotated with the floppy disk placed on the rotor yoke and said center shaft inserted into said central aperture of said center hub, said drive pin is inserted into said drive pin aperture of the center hub and comes into abutment, within the drive aperture, with said front and outer edges of the drive pin aperture.

2. A chucking device in a floppy disk drive according to claim 1, wherein said spring is constituted by a generally U-bent wire rod, the bent portion of the spring being positioned so as to extend along an outer peripheral portion of a pin projecting from a lower surface of said rotor yoke, one end portion of said spring is fixed to the lower surface of the rotor yoke, while the opposite end portion of the spring is made movable, said movable end portion of the spring being urged not only in a direction away from the rotational axis of the rotor yoke but also upward of the rotor yoke and engaged with said drive pin to push the drive pin upward and also in the direction away from the rotational axis of the rotor yoke.

3. A chucking device in a floppy disk drive according to claim 1, wherein a magnetic disk which attracts said center hub of the floppy disk magnetically is placed on an upper surface of said rotor yoke, a cutout portion for insertion therein of said drive pin is formed in said magnetic disk, said cutout portion having a conduction path which is inclined in a gradually retreating direction as the distance from the rotational axis of the rotor yoke becomes longer, said magnetic disk being fixed to the rotor yoke so that said conduction path comes into abutment with a rear side face of the drive pin, and when the rotor yoke is rotated, the drive pin is held between the front edge of said drive pin aperture in the center hub and the conduction path of said cutout portion and is urged in this state to the outer edge of the drive pin aperture.

4. A chucking device in a floppy disk drive according to claim 1, wherein said drive pin through hole is in the shape of a keyhole comprising a main hole and a mounting hole both contiguous to each other, said mounting hole having a shape which permits insertion therein of said lower flange of said drive pin, said main hole having a shape which prevents the drive pin from falling off in a mounted state of the drive pin, and the drive pin is fitted into the drive pin through hole in such a manner that the lower portion of the drive pin, including the lower flange, is inserted into said mounting hole and is then shifted into the main hole.

* * * * *